(12) United States Patent
Sakata et al.

(10) Patent No.: US 7,034,808 B2
(45) Date of Patent: Apr. 25, 2006

(54) TOUCH PANEL AND ELECTRONIC DEVICE

(75) Inventors: Hidefumi Sakata, Nagano-ken (JP); Tetsuhiko Takeuchi, Nagano-ken (JP); Hidehito Iisaka, Shiojiri (JP); Shohei Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 247 days.

(21) Appl. No.: 10/046,233

(22) Filed: Jan. 16, 2002

(65) Prior Publication Data
US 2002/0101410 A1 Aug. 1, 2002

(30) Foreign Application Priority Data
Jan. 17, 2001 (JP) ............................ 2001-009423
Nov. 9, 2001 (JP) ............................ 2001-344943

(51) Int. Cl.
*G09G 5/00* (2006.01)

(52) U.S. Cl. .................................................... 345/173

(58) Field of Classification Search ........ 345/173–178, 345/74.1, 75.2; 178/18.03, 18.05, 18.06; 200/512, 514; 359/454; 445/35–37, 46, 445/47, 49
See application file for complete search history.

(56) References Cited

U.S. PATENT DOCUMENTS

| | | | | |
|---|---|---|---|---|
| 5,977,888 A * | 11/1999 | Fujita et al. | ................... | 341/34 |
| 6,078,274 A * | 6/2000 | Inou | ............................ | 345/173 |
| 6,326,723 B1 * | 12/2001 | Raj et al. | ..................... | 359/290 |
| 6,495,253 B1 * | 12/2002 | Koyama et al. | ............. | 428/343 |
| 6,556,189 B1 * | 4/2003 | Takahata et al. | ............. | 345/173 |
| 6,559,902 B1 * | 5/2003 | Kusuda et al. | ................. | 349/12 |
| 6,583,935 B1 * | 6/2003 | Saif et al. | ..................... | 200/512 |

(Continued)

FOREIGN PATENT DOCUMENTS

JP 64-038701 2/1989

(Continued)

OTHER PUBLICATIONS

Grann et al.; "Optimal Design for Antireflective Tapered Two-Dimensional Subwavelength Grating Structures"; vol. 12, No. 2; Feb. 1995; Journal of the Optical Society of America A; pp. 333-339.

*Primary Examiner*—Amare Mengistu
(74) *Attorney, Agent, or Firm*—Oliff & Berridge, PLC

(57) ABSTRACT

The present invention provides a touch panel having pluralities of projections, each of the projections having a predetermined shape, formed on inner surfaces of a lower substrate and an upper substrate, respectively. The projections being formed in at least two directions with a substantially periodical pitch that is shorter than any wavelength of visible light. The touch panel can also include a lower transparent electrode and an upper transparent electrode formed over the inner surfaces of the lower substrate and the upper substrate having the pluralities of projections, respectively. The cross-sectional area of each of the projections parallel to the outer surface of the lower substrate is configured to decrease continuously from bottom to top of the projection. The same applies to the combination of each of the projections, the bottom and a top thereof, and the upper substrate. Accordingly, this structure reduces the light reflection and diffraction at the boundary between an air space and the transparent electrode, thereby providing a resistive contact-type touch panel or a electrostatic capacitive coupling-type touch panel having high light transmittance.

16 Claims, 9 Drawing Sheets

U.S. PATENT DOCUMENTS 6,611,256 B1 * 8/2003 Randall ................ 345/173
6,937,230 B1 * 8/2005 Hatakeda et al. .......... 345/173

FOREIGN PATENT DOCUMENTS

| JP | 406032077 A | * | 2/1994 |
| JP | 06-325657 | | 11/1994 |
| JP | 407169367 A | * | 7/1995 |
| JP | 07-219697 | | 8/1995 |
| JP | 11-109103 | | 4/1999 |
| JP | 11-250764 | | 9/1999 |
| JP | 11250764 A | * | 9/1999 |
| JP | 2001-004442 | | 1/2001 |

* cited by examiner

[Fig. 1]
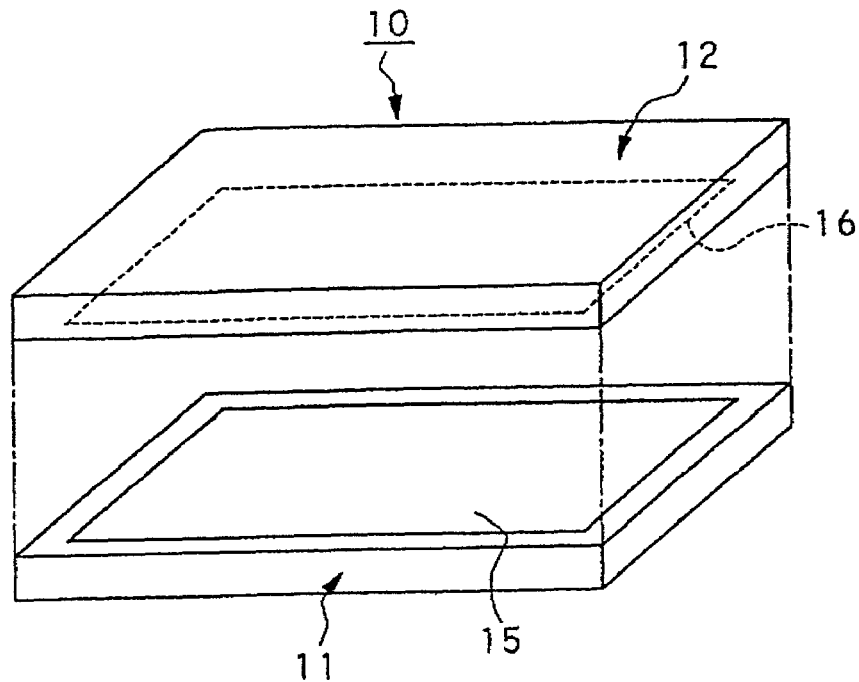
[Fig. 2]
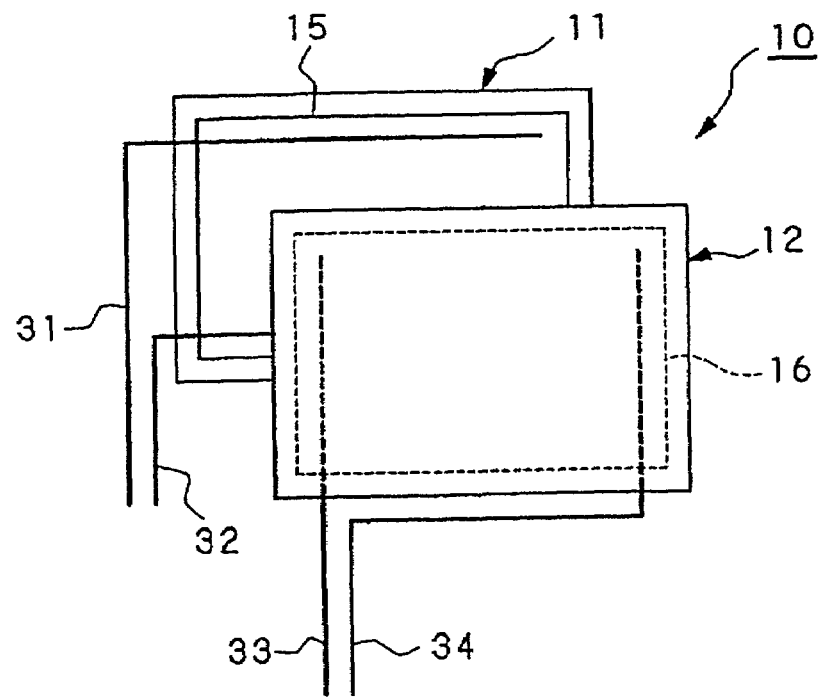

[Fig. 3]
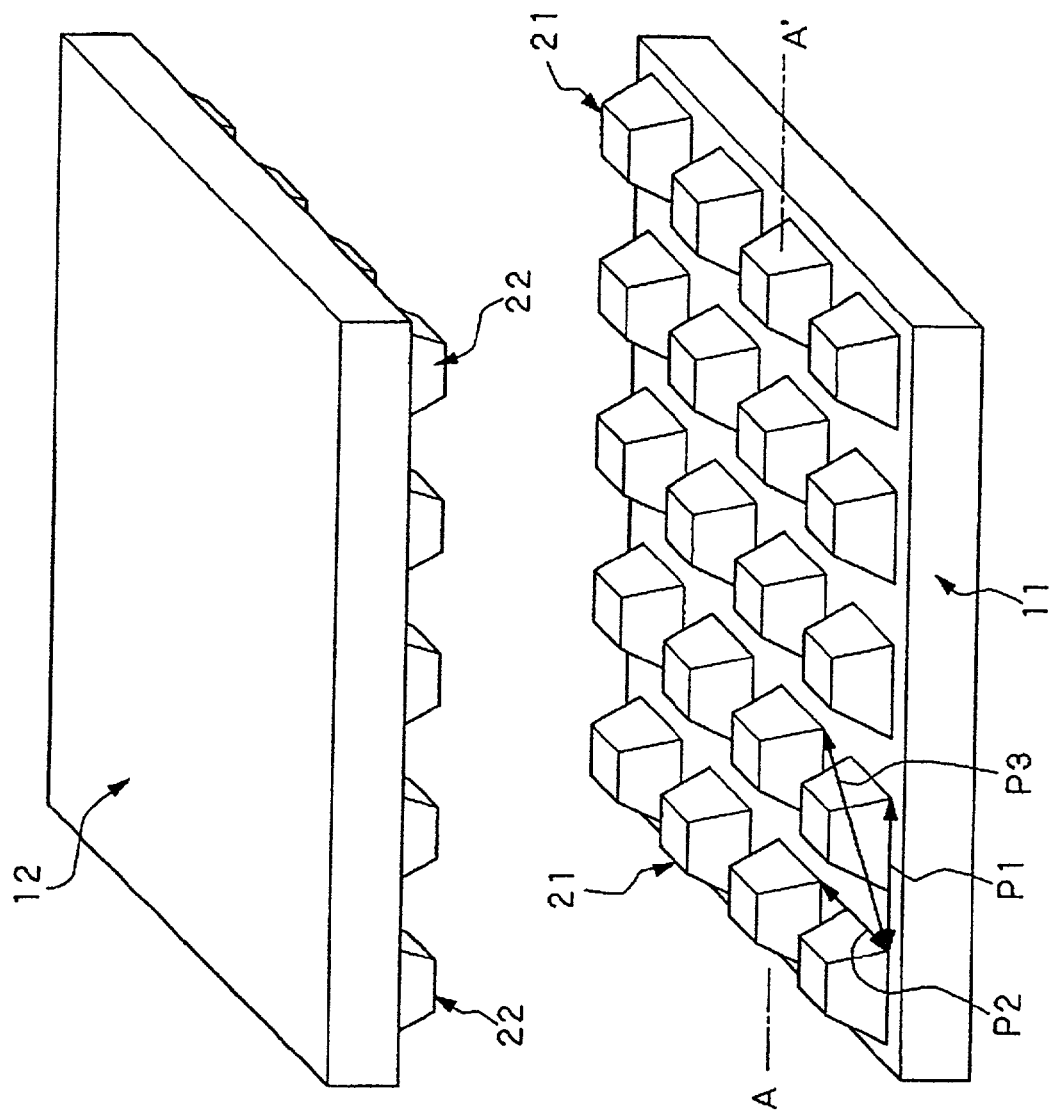

[Fig. 4]
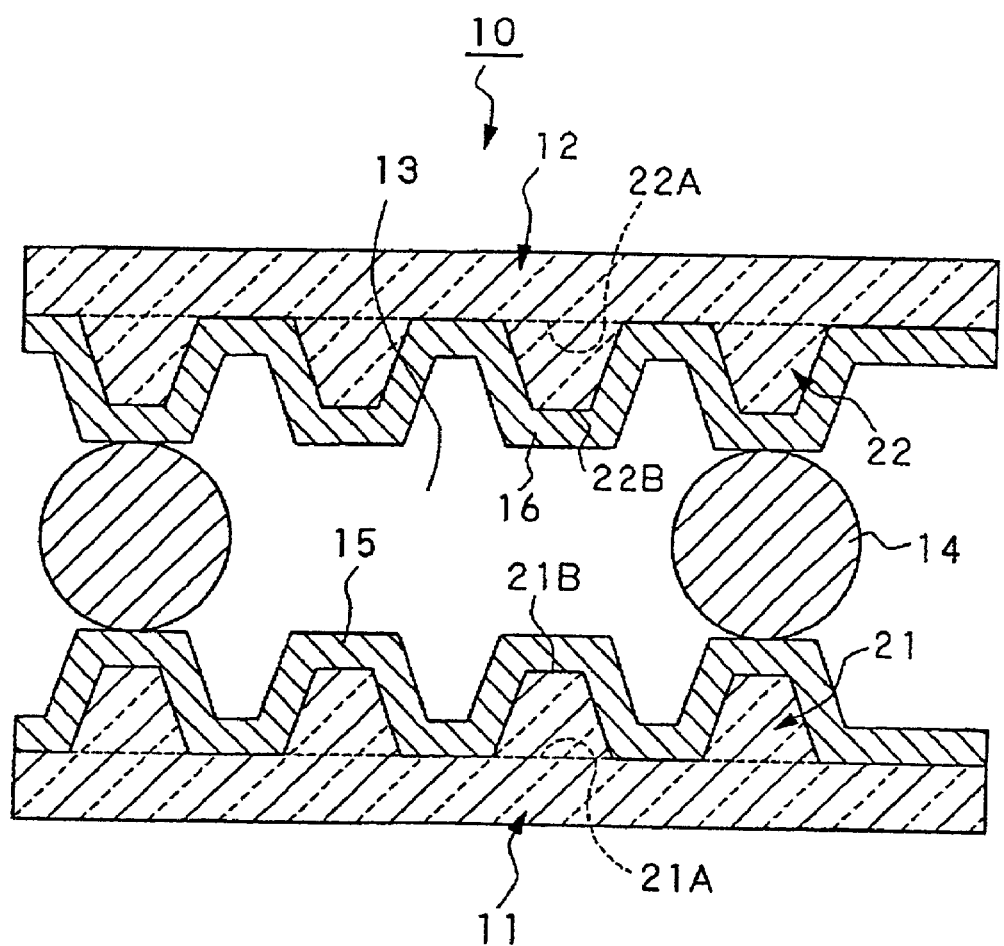

[Fig. 5]
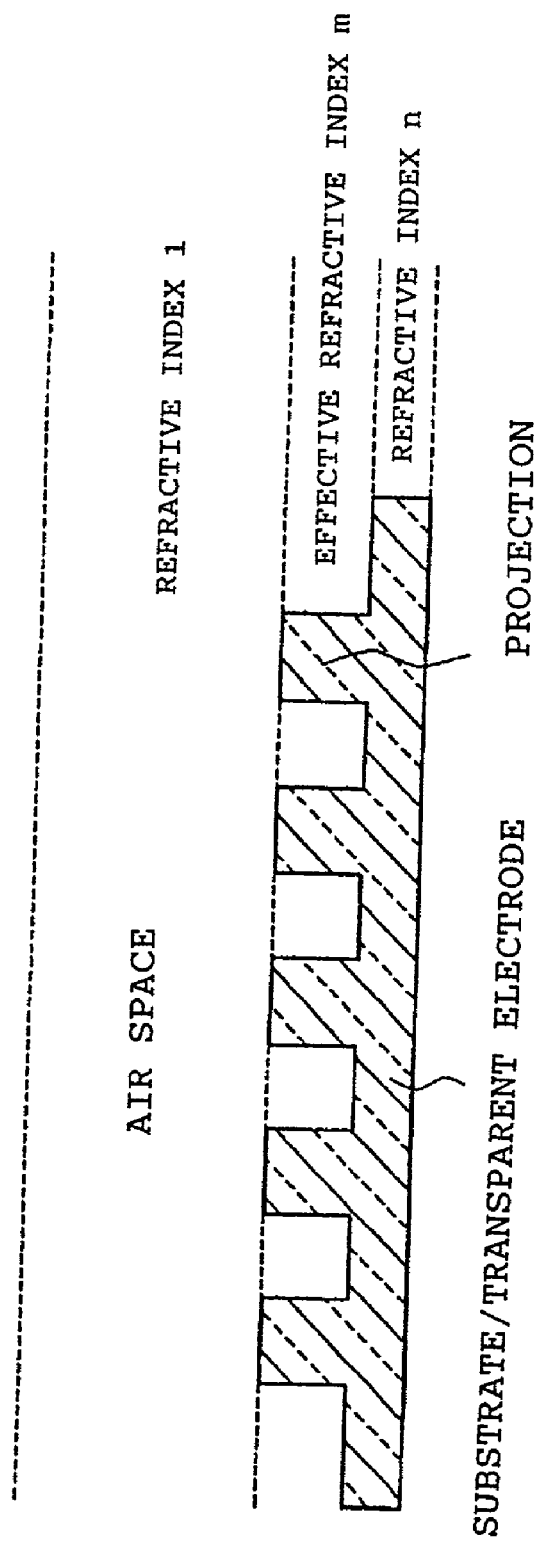

[Fig. 6]
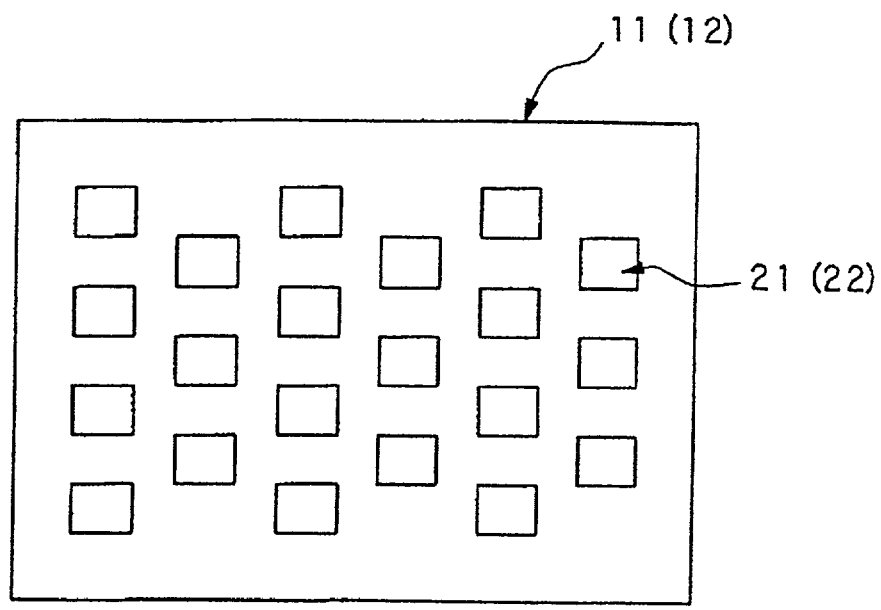

[Fig. 7]
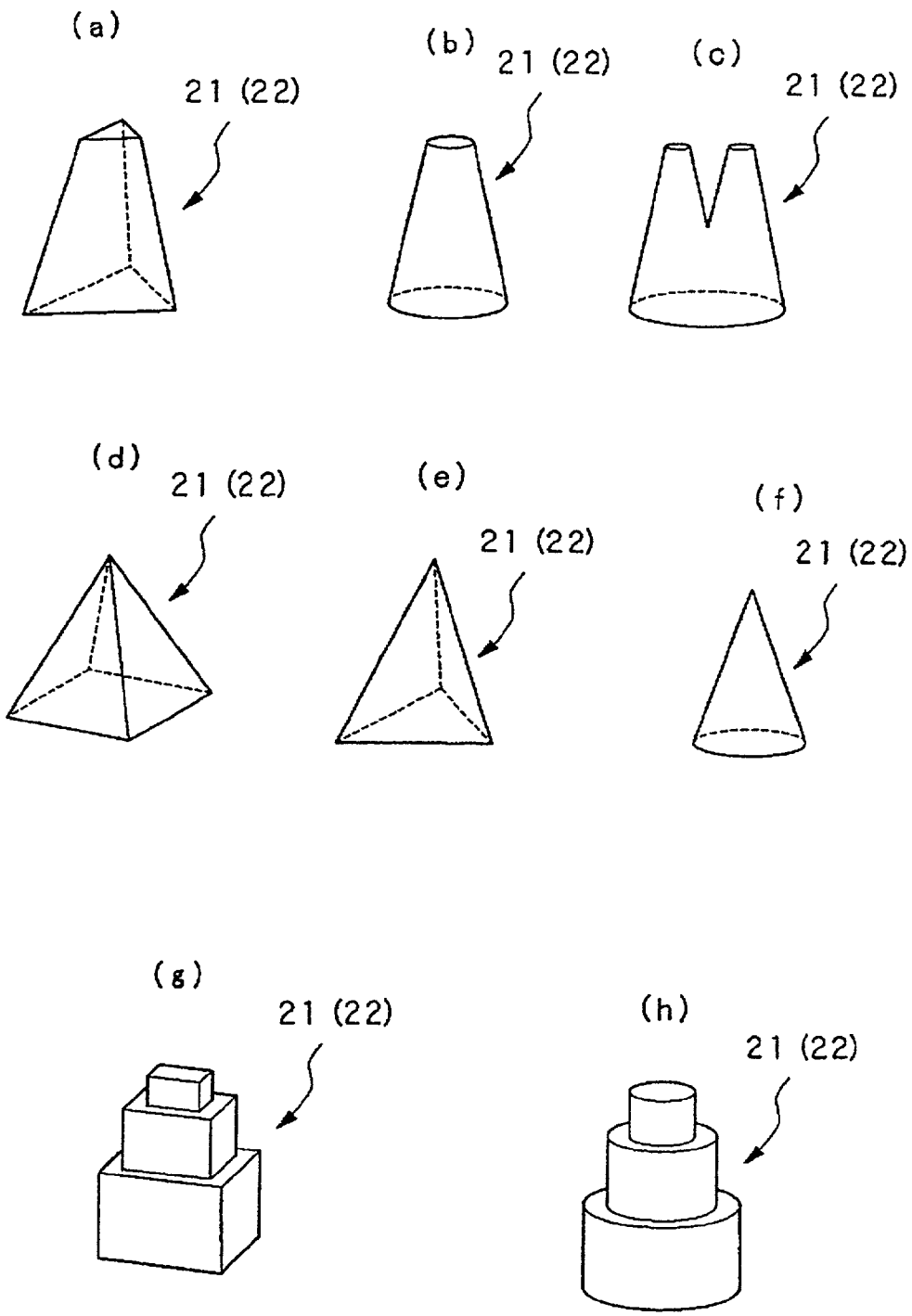

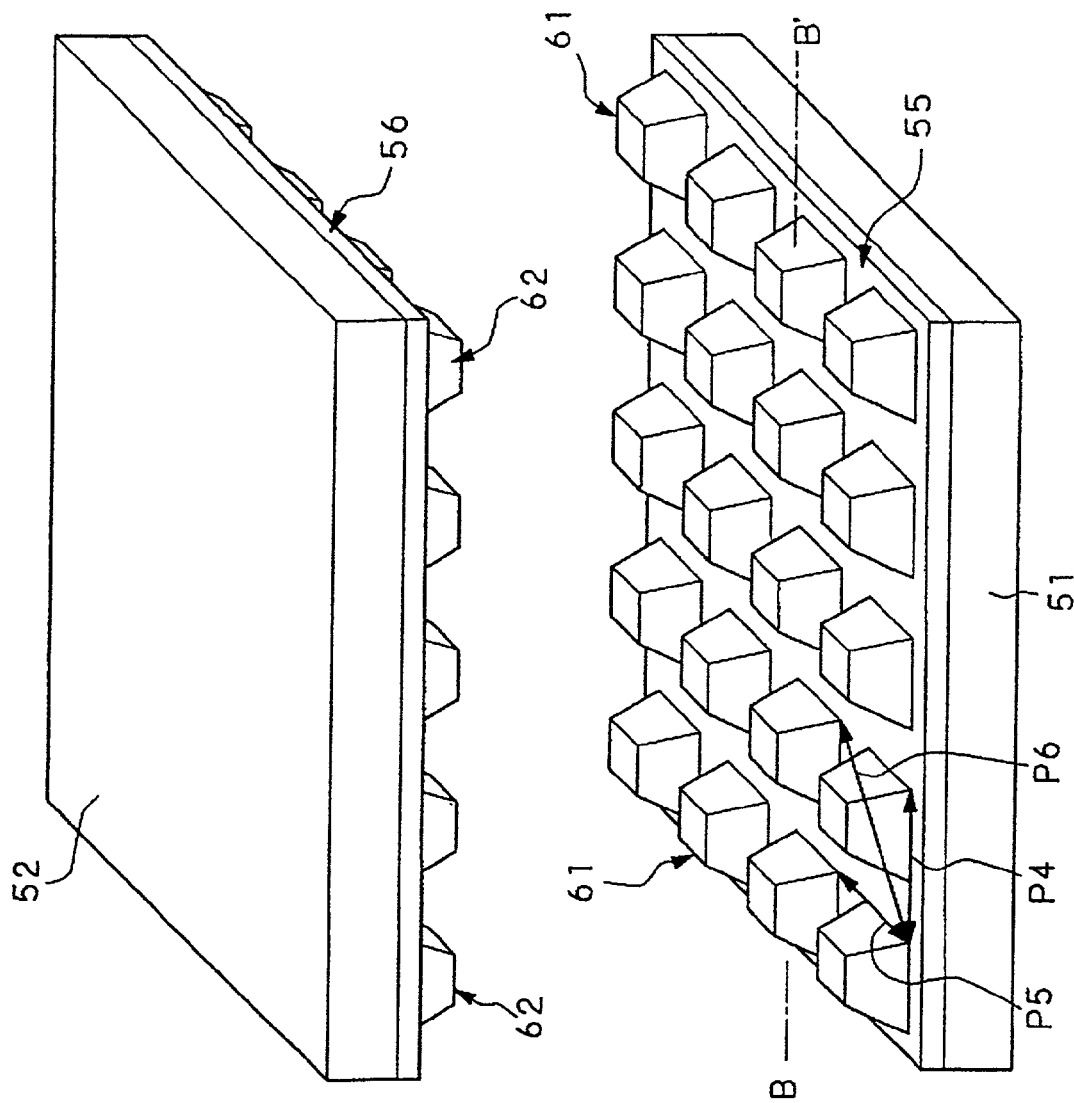
[Fig. 8]

[Fig. 9]
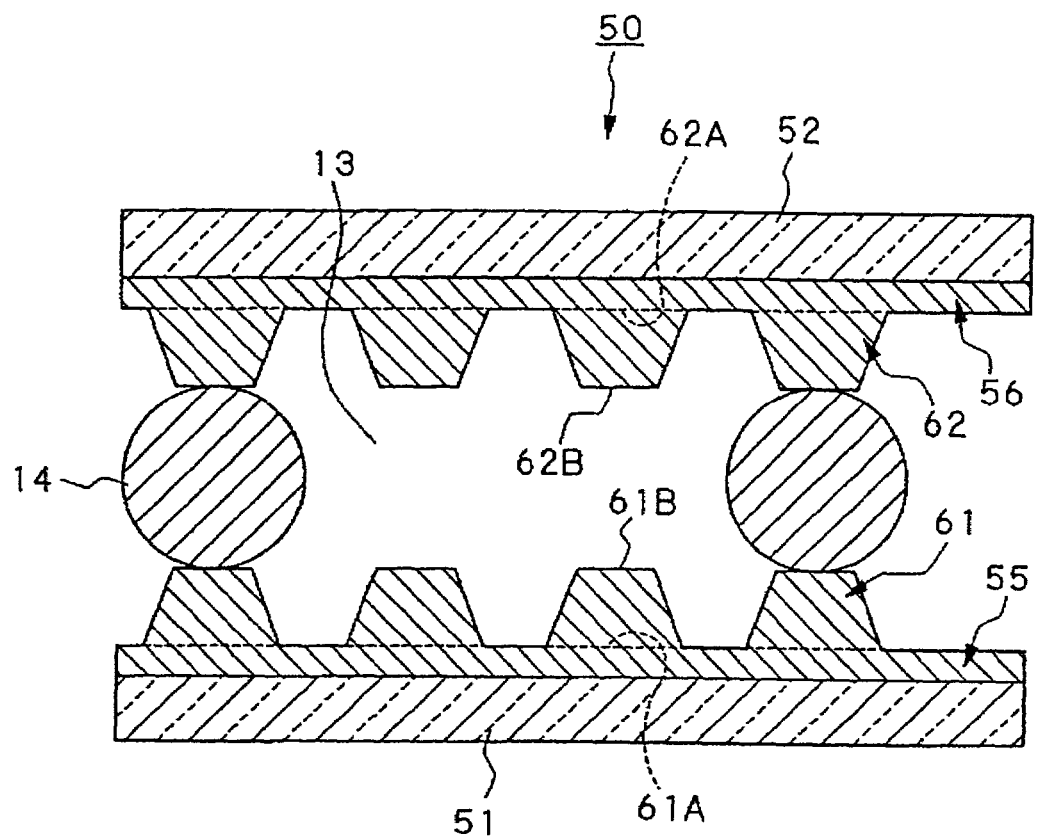

[Fig. 10]
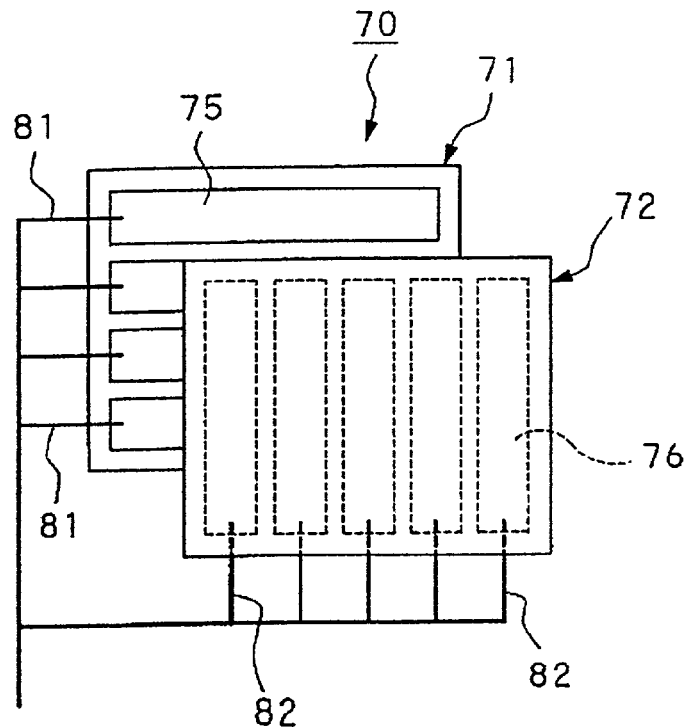
[Fig. 11]
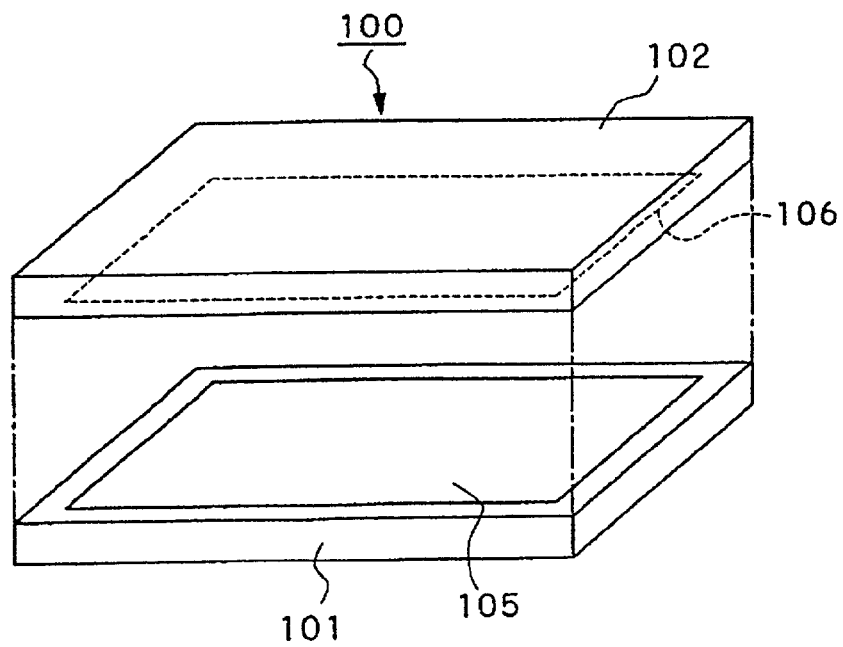

TOUCH PANEL AND ELECTRONIC DEVICE

BACKGROUND OF THE INVENTION

1. Field of Invention

The present invention relates to a touch panel capable of input by a finger, a pen, or the like.

2. Description of Related Art

Currently, touch panels have been developed as coordinate detection devices, mounted on electronic devices, such as small portable information devices, and capable of input by a finger, a pen, or the like. Known touch panels for position detection as in the coordinate detection devices are of a resistive contact type and an electrostatic capacitive coupling type which can achieve a simple structure and a thin profile of the touch panels. The resistive contact type includes an analog resistive contact type and a digital resistive contact type. The former is capable of analog input, such as character input, and the latter is capable of on-off actions of a switch at the position of the touch panel touched by a finger, a pen, or the like.

All types of touch panels, that is, the analog resistive contact type, the digital resistive contact type, and the electrostatic capacitive coupling type for position detection, can have the same basic structure in which a pair of substrates oppose each other with a predetermined spacing therebetween and have a pair of transparent electrodes in a predetermined configuration on the inner surfaces of the substrates.

Referring now to FIG. 11, the structure of the analog resistive contact-type touch panel will be briefly described by way of example of a known touch panel. FIG. 11 is an exploded perspective view illustrating a known analog resistive contact-type touch panel 100.

As shown in FIG. 11, the touch panel 100 has a lower substrate 101 and an upper substrate 102 opposing each other with a predetermined spacing therebetween and an air space (not shown) is interposed therebetween. A lower transparent electrode 105 and an upper transparent electrode 106 made of indium tin oxide, etc., are formed on substantially the entire inner surfaces of the lower substrate 101 and the upper substrate 102, respectively. The resistive contact-type touch panel 100 for position detection has a structure in which the upper substrate 102 is formed of a flexible substrate, such as a plastic film or the like, and is deformed at a position thereof which is pressed by a finger, a pen, or the like so that the lower transparent electrode 105 and the upper transparent electrode 106 are brought into contact with each other.

When a known touch panel of the analog resistive contact type, the digital resistive contact type, or the electrostatic capacitive coupling type is mounted on the view side of a display device such as a liquid crystal panel, outside light entering from the operator side is incident on the upper substrate, passes through the upper transparent electrode, the air space, the lower transparent electrode, and the lower substrate in that order, and then is incident on the display device. Light emitted from the display device passes through in the reverse route and is emitted from the operator side.

While the refractive index of the air space is 1, the refractive index of either of the transparent electrodes is large, that is, about 1.97. The difference in the refractive indexes of the air space and the transparent electrode causes light incident on the transparent electrode from the air space, or vice versa, to be reflected at the surface of the transparent electrode, i.e., at the boundary between the air space and the transparent electrode. This leads to lower light transmittance of the touch panel, thereby possibly resulting in lower visibility of the display device.

To solve this problem, a proposal has been made in which a liquid space having a refractive index close to that of the transparent electrode is interposed between the pair of substrates instead of the air space. Though the liquid space interposed between the pair of substrates prevents the light reflection at the surface of the transparent electrode, air bubbles may be formed in the liquid space, thereby possibly causing a problem of lower visibility of the display device provided with this type of touch panel.

SUMMARY OF THE INVENTION

The present invention has been made in view of the above problems. Accordingly, it is an object of the present invention to provide a resistive contact-type touch panel or an electrostatic capacitive coupling-type touch panel having high light transmittance by reducing the light reflection at the boundaries between an air space and transparent electrodes.

A touch panel according to the present invention can include a pair of substrates opposing each other with a predetermined spacing therebetween, a pair of transparent electrodes formed in a respectively predetermined pattern on the inner surfaces of the pair of substrates, and a plurality of projections formed on the surface of at least one of the pair of transparent electrodes with a substantially periodical pitch shorter than any wavelength of visible light.

An air space is preferably formed between the pair of electrodes. When the projections and depressions are formed in a substantially periodical manner on the surface of the transparent electrode, light incident on the transparent electrode from the air space is reflected and diffracted at the lower transparent electrode. However, the projections and depressions formed with a substantially periodical pitch shorter than any wavelength of visible light reduce the light reflection and diffraction at the boundary between the air space and the transparent electrode. The projections and depressions thus increase light transmission on the transparent electrode. Accordingly, the light reflection and diffraction at the boundary between the air space and the transparent electrode can be reduced in the touch panel of the present invention.

Each of the projections is preferably formed to become smaller from the bottom to the top thereof. Defining the shape of the projection to be tapered in this manner serves to ease a sudden change in the effective refractive index in the region between the air space and the outer surface of the substrate, thereby further reducing the reflection and diffraction at the boundary between the air space and the transparent electrode.

The projection is preferably formed to become smaller in a continuous or stepwise manner from the bottom to the top thereof, particularly as a truncated pyramid or a truncated cone or as a pyramid or a cone.

The plurality of projections are preferably arranged in a substantially periodical manner in at least two directions.

When the plurality of projections are formed only in one direction in a substantially periodical manner, polarized light travelling orthogonal to the direction is hardly affected by the periodic structure of the projections. That is, reflection and diffraction of the polarized light are not reduced at the boundary between the air space and the transparent electrode. This problem can be solved by arranging the projections in a substantially periodical manner in at least two directions.

The plurality of projections can preferably have a pitch ranging from 10 to 100 nm.

The plurality of projections are preferably formed on the surfaces of the pair of transparent electrodes. In this case, the plurality of projections formed on the surface of one of the pair of transparent electrodes may have a pattern of the same as or different from that of the other transparent electrode.

The projection may be formed by providing a projection on the surface of the substrate and the transparent electrode may be formed over the projection of the substrate. Alternatively, the projection may be formed by providing a projection on the transparent electrode.

The touch panel may further include a plurality of spacers, between the pair of transparent electrodes, for keeping the spacing between the pair of transparent electrodes.

The touch panel may be any one of an analog resistive contact type, a digital resistive contact type, and an electrostatic capacitive coupling type.

An electronic device of the present invention can include a touch panel. The touch panel may have a lower substrate, a flexible input substrate opposing the lower substrate with a predetermined spacing therebetween, a lower transparent electrode with a predetermined pattern formed on the inner surface of the lower substrate, an input transparent electrode with a predetermined pattern formed on the inner surface of the input substrate so as to oppose the lower transparent electrode with a predetermined spacing therebetween, and a plurality of projections formed on the surface of at least one of the lower transparent electrode and the input transparent electrode with a substantially periodic pitch shorter than any wavelength of visible light.

In the touch panel of the electronic device, the light reflection and diffraction at the boundary between the air space and the transparent electrode can be reduced.

BRIEF DESCRIPTION OF THE DRAWINGS

The present invention will be described with reference to the accompanying drawings, wherein like numerals reference like elements, and wherein:

FIG. 1 is an exploded perspective view of the overall structure of a touch panel according to a first embodiment of the present invention;

FIG. 2 is a plan view of the overall structure of the touch panel according to the first embodiment of the present invention;

FIG. 3 is a fragmentary exploded perspective view of the touch panel in an enlarged scale according to the first embodiment of the present invention;

FIG. 4 is a fragmentary sectional view of the touch panel in an enlarged scale according to the first embodiment of the present invention;

FIG. 5 is an illustration of a relaxation effect of a change in the effective refractive index in the region between an air space and an outer surface of a substrate by forming projections and depressions on an inner surface of a transparent electrode according to the first embodiment of the present invention;

FIG. 6 is a plan view illustrating another pattern of the projections according to the first embodiment of the present invention;

FIGS. 7(a) to (h) are perspective views, each illustrating a shape of the projections other than the shape shown in the above drawings, according to the first embodiment of the present invention;

FIG. 8 is a fragmentary exploded perspective view of a touch panel in an enlarged scale according to a second embodiment of the present invention;

FIG. 9 is a fragmentary sectional view of the structure of the touch panel according to the second embodiment of the present invention;

FIG. 10 is a plan view of the overall structure of a touch panel according to a third embodiment of the present invention; and FIG. 11 is an exploded perspective view of the structure of a known touch panel.

DETAILED DESCRIPTION OF PREFERRED EMBODIMENTS

Embodiments of the present invention will now be described in detail.

The structure of an analog resistive contact-type touch panel according to a first embodiment of the present invention will be described with reference to FIGS. 1 to 4. FIG. 1 is an exploded perspective view of the overall structure of the touch panel according to the embodiment. FIG. 2 is a plan view of the overall structure of the touch panel according to the embodiment. FIG. 3 is a fragmentary exploded perspective view of the touch panel according to the embodiment in an enlarged scale. FIG. 4 is a fragmentary sectional view of the touch panel according to the embodiment in an enlarged scale.

FIG. 2 is a plan view wherein the touch panel is viewed from above an upper substrate of the touch panel such that a lower substrate and the upper substrate of the touch panel are staggered while being parallel to each other. FIG. 3 is a perspective view of the lower substrate and the upper substrate alone, which will be described later, of the touch panel according to the embodiment. FIG. 4 is a sectional view of the touch panel according to the embodiment taken along the line A–A' indicated in FIG. 3. Each layer and each member are drawn in a different scale in each drawing so as to be large enough to be visible.

As shown in FIGS. 1 and 2, a touch panel 10 according to the embodiment has a lower substrate 11 made of a transparent substrate such as glass or a transparent plastic film and an upper substrate 12 made of a transparent and flexible substrate such as a transparent plastic film, opposing each other with a predetermined spacing therebetween. Inner surfaces of the lower substrate 11 and the upper substrate 12 respectively have a lower transparent electrode 15 and an upper transparent electrode 16, made of, e.g., indium tin oxide, formed on substantially the entire surfaces corresponding to at least an input area by a finger, a pen, or the like.

As shown in FIG. 2, the lower transparent electrode 15 is connected to wires 31 and 32 at the upper and lower sides shown in the drawing, respectively, and the upper transparent electrode 16 is connected to wires 33 and 34 at the left and right sides shown in the drawing, respectively. In the touch panel 10 according to the embodiment, the upper substrate 12 and the lower substrate 11 are assumed to lie at the operator side and the display device side having the touch panel 10, respectively.

As shown in enlarged scales in FIGS. 3 and 4, the inner surfaces of the lower substrate 11 and the upper substrate 12 can include large numbers of fine projections 21 and 22, respectively. The lower transparent electrode 15 and the upper transparent electrode 16 are formed in accordance with the configurations of the inner surfaces of the lower substrate 11 and the upper substrate 12 having the projections 21 and 22, respectively. The projections 21 and 22 are not shown in FIGS. 1 and 2, because they are too small compared to the sizes of the lower substrate 11 and the upper substrate 12, and to the spacing between these substrates.

The projections 21 and 22 may be made of members different from those of the lower substrate 11 and the upper substrate 12. As shown in FIGS. 3 and 4, however, the projections 21 and 22 are preferably integrated with the lower substrate 11 and the upper substrate 12, respectively, so as to simplify the fabrication step for the projections 21 and 22. Techniques for integrally forming the projections 21 and 22 with the lower substrate 11 and the upper substrate 12, respectively, include a method in which a mold having a pattern of the projections 21 and 22 is pushed into one of the surfaces of a flat plastic film which is softened by heating. The shapes and the patterns of the projections 21 and 22 will be described in greater detail later.

The spacing between the lower substrate 11 and the upper substrate 12, having the lower transparent electrode 15 and upper transparent electrode 16, respectively, i.e., the spacing between the lower transparent electrode 15 and the upper transparent electrode 16, is on the order of several micrometers, and an air space 13 is interposed between the lower substrate 11 and upper substrate 12, i.e., between the lower transparent electrode 15 and upper transparent electrode 16 as shown in FIG. 4. A large number of spherical spacers 14, each having a diameter equal to the spacing between the lower substrate 11 and the upper substrate 12 (about several micrometers), is disposed between the lower transparent electrode 15 and upper transparent electrode 16 so as to avoid contact of the lower transparent electrode 15 and upper transparent electrode 16 in the event of no input by a finger, a pen, or the like.

The resistive contact-type touch panel 10 has a structure in which the flexible upper substrate 12 is deformed at a position of the upper substrate 12 pressed by a finger, a pen, or the like from its outer surface, causing the upper transparent electrode 16 to come into contact with the lower transparent electrode 15 at the pressed position. This structure allows the touch panel 10 to perform position detection.

The principal of the position detection in the touch panel 10 according to the embodiment will be described briefly with reference to FIG. 2. For position detection in the horizontal direction shown in the drawing, a predetermined voltage is applied across the wires 33 and 34 of the upper substrate 12 so as to provide the upper transparent electrode 16 with a potential gradient in the horizontal direction while providing the entire lower transparent electrode 15 with an equipotential. Thus, a horizontal position is detected based on the principal in which the detected voltage varies depending on the position where the lower transparent electrode 15 and the upper transparent electrode 16 are put in contact with each other by a finger, a pen, or the like.

In the meantime, position detection in the vertical direction shown in the drawing is accomplished in a similar fashion to that in the horizontal direction shown in the drawing. That is, a predetermined voltage is applied across the wires 31 and 32 of the lower substrate 11 so as to provide the lower transparent electrode 15 with a potential gradient in the vertical direction shown in the drawing while providing the entire upper transparent electrode 16 with an equipotential. Thus, a vertical position is detected based on the principal in which the detected voltage varies depending on the position where the lower transparent electrode 15 and the upper transparent electrode 16 are put in contact with each other by a finger, a pen, or the like.

With the above-described principal of position detection in the vertical and horizontal directions, a position (a coordinate point), where the lower transparent electrode 15 and the upper transparent electrode 16 are put in contact with each other by a finger, a pen, or the like, is detected.

The shapes and patterns of the projections 21 and 22 respectively formed on the inner surfaces of the lower substrate 11 and the upper substrate 12 will be described. As shown in FIGS. 3 and 4, each of the projections 21 and 22 can be formed as a truncated quadrangular pyramid. Reference numerals 21A and 22A respectively represent the bottoms of the projections 21 and 22, and reference numerals 21B and 22B respectively represent the tops of the projections 21 and 22. The cross-sectional area of each of the projections 21, parallel to the outer surface of the lower substrate 11, is formed to decrease continuously from the bottom 21A to the top 21B of the projection 21. The same applies to the combination of each of the projections 22 of the upper substrate 12, and the bottom 22A and the top 22B of the projection 22.

The bottom 21A of the projection 21 lies on the display device side (the lower side shown in the drawing) and the top 21B of the projection 21 lies on the operator side (the upper side shown in the drawing). The bottom 22A of the projection 22 lies on the operator side (the upper side shown in the drawing) and the top 22B of the projection 22 lies on the display device side (the lower side shown in the drawing).

As also shown in FIG. 3, arranged on the inner surfaces of the lower substrate 11 and the upper substrate 12 are the projections 21 and 22 in a substantially periodical manner in three directions shown in the drawing; the vertical and horizontal directions which are orthogonal to each other, and the diagonal direction, thus being arranged in a substantially matrix configuration as a whole.

Pitches P1, P2 and P3 of the projections 21 and 22 in the horizontal, vertical, and diagonal directions shown in the drawing are arranged to be shorter than any wavelength of visible light. The pitches P1, P2 and P3 of the projections 21 and 22 can be preferably equal to or shorter than approximately one fifth of the shortest wavelength of visible light. The shorter the pitches P1, P2 and P3 of the projections 21 and 22, the better, however, the pitches are preferably arranged to range from 10 to 100 nm since pitches shorter than 10 nm cause the fabrication step of the projections 21 and 22 to become more complicated. Though illustrated in an exaggerated manner, the pitches P1, P2 and P3 of the projections 21 and 22 are extremely small, that is, on the order of nanometers, while the distance between the lower transparent electrode 15 and the upper transparent electrode 16 is on the order of micrometers.

In this embodiment, as described above, the lower transparent electrode 15 can be formed over the inner surface of the lower substrate 11 having the large number of fine projections 21 arranged with the substantially periodical pitches P1, P2, and P3 shorter than any wavelength of visible light. Thus, projections and depressions having a predetermined shape are formed on the inner surface of the lower transparent electrode 15 with the substantially periodical pitches P1, P2, and P3 shorter than any wavelength of visible light. The same applies to the combination of the upper transparent electrode 16, the upper substrate 12, and the large number of fine projections 22.

When the projections and depressions are formed in a substantially periodical manner on the inner surface of the lower transparent electrode 15, light incident from the air space 13 is reflected and diffracted at the lower transparent electrode 15. However, the projections and depressions formed with the substantially periodical pitches P1, P2, and P3 shorter than any wavelength of visible light reduce the light reflection and diffraction at the boundary between the air space 13 and the lower transparent electrode 15. The projections and depressions thus increase the light transmission on the lower transparent electrode 15. The same applies to the combination of the upper transparent electrode 16 and the air space 13.

According to the embodiment, the light reflection and diffraction at the boundary between the air space 13 and the lower transparent electrode 15 and at the boundary between the air space 13 and the upper transparent electrode 16 are thus reduced, thereby providing the analog resistive contact-type touch panel 10 having high light transmittance.

According to the embodiment, the lower substrate 11 and the upper substrate 12 are provided with the projections 21 and 22, respectively. Accordingly, both kinds of light reflection decrease: one for light incident from the operator side and reflected at the surface of the lower transparent electrode 15, and the other for light emitted from the display device side and reflected at the surface of the upper transparent electrode 16.

It should be understood that the present invention is not limited to a structure in which both the lower substrate 11 and the upper substrate 12 are provided with the projections 21 and 22, respectively, but may include another structure in which at least one of the lower substrate 11 and the upper substrate 12 is provided with projections. The latter structure reduces at least one of the two kinds of light reflection: one for light incident from the operator side and reflected at the surface of the lower transparent electrode 15, and the other for light emitted from the display device side and reflected at the surface of the upper transparent electrode 16.

When the projections 21 and 22 are formed only in one direction in a substantially periodical manner, polarized light travelling orthogonal to the direction does not see the periodic structure of the projections 21 and 22. In other words, reflection and diffraction of the polarized light are not reduced at the boundary between the air space 13 and the lower transparent electrode 15 and at the boundary between the air space 13 and the upper transparent electrode 16. Since the projections 21 and 22 are arranged in a substantially periodical manner in at least two directions including two mutually orthogonal directions in the embodiment, reflection and diffraction of all visible light are reduced at the boundary between the air space 13 and the lower transparent electrode 15 and at the boundary between the air space 13 and the upper transparent electrode 16.

Further, each of the projections 21 is formed in the embodiment such that the cross-sectional area of the projection 21, parallel to the outer surface of the lower substrate 11, continuously decreases from the bottom 21A to the top 21B of the projection 21. Defining the shape of the projection 21 as described above serves to make a gradual change in the effective refractive index in the region between the air space 13 and the outer surface of the lower substrate 11, thereby further reducing the light reflection and diffraction at the boundary between the air space 13 and the lower transparent electrode 15. The same applies to the combination of each of the projections 22, the bottom 22A and the top 22B of the projection 22, the upper substrate 12, and the upper transparent electrode 16.

This reduction in the light reflection and diffraction will be described briefly with reference to FIG. 5. Because the difference in refractive indexes of the substrate and the transparent electrode is negligibly small in comparison to that in refractive indexes of air and the substrate or of air and the transparent electrode, the substrate and the transparent electrode will be regarded as an integral unit in the following description. The term "the substrate/transparent electrode" stands for the integral unit of the substrate and the transparent electrode. FIG. 5 is a sectional view of the substrate/transparent electrode having prismatic projections formed periodically on the surface thereof, and illustrates the air space formed on the projection side of the substrate/transparent electrode.

As shown in FIG. 5, the refractive index of air space is "1", and that of the substrate/transparent electrode is assumed to be "n". Thus, the effective refractive indexes in the horizontal direction shown in the drawing are "1" in the region above the projections where only the air space resides, and "n" in the region below the projections where only the substrate/transparent electrode resides. Meanwhile, the effective refractive index in the horizontal direction shown in the drawing is "m" in the region where the projections are arranged, "m" being larger than "1" but smaller than "n" because of the mixed configuration of the projections and the air space. That is, the flat substrate/transparent electrode being in contact with the air space causes the refractive index to vary suddenly from "1" to "n" at the boundary between the air space and the substrate/transparent electrode. Meanwhile, the substrate/transparent electrode having the prismatic projections formed on the surface thereof allows the effective refractive index in the region between the air space and the outer surface of the substrate/transparent electrode to increase gradually from "1" to "n", thereby easing the change in the effective refractive indexes so as to further reduce the light reflection and diffraction at the boundary between the air space and the substrate/transparent electrode.

Furthermore, when the cross-sectional area is taken parallel to the outer surface of the substrate, the ratio of the cross-sectional area of the substrate/transparent electrode to that of the air space varies continuously, because the projections are formed as a truncated quadrangular pyramid as described in the embodiment. Thus, the effective refractive index in the region between the air space and the outer surface of the substrate varies gradually, thereby further reducing the light reflection and diffraction at the boundary between the air space and the substrate/transparent electrode.

In this embodiment, though the projections 21 and 22 are arranged in a substantially matrix-like manner on the inner surfaces of the lower substrate 11 and the upper substrate 12, respectively, it is to be understood that the present invention is not limited to this structure. As long as pluralities of projections are formed with a pitch shorter than any wavelength of visible light and arranged in a substantially periodical manner in at least two directions on the inner surfaces of the lower substrate 11 and the upper substrate 12, the projections may be provided in any pattern without departing from the spirit and scope of the present invention.

An exemplary pattern of the projections other than the pattern described in the embodiment is shown in FIG. 6. FIG. 6 is a plan view of the lower substrate 11 or the upper substrate 12 viewed from the projections 21 or 22, showing only the bottoms of the projections 21 or 22, respectively. In this pattern, the projections 21 or 22 are arranged in a substantially periodical manner in the vertical, horizontal, and diagonal directions shown in the drawing.

Although the projections 21 and 22 are formed in the same pattern in this embodiment, it should be understood that the present invention is not limited to this structure. The projections 21 may be formed in a pattern different from that of the projections 22 without departing from the spirit and scope of the present invention.

Although the projections 21 and 22 are formed as a truncated quadrangular pyramid in the embodiment, the present invention is not limited to this shape. As long as the projections 21 provide a co-existing layer of the air space 13 and the projections 21 for easing a sudden change in the effective refractive index in the region between the air space 13 and the outer surface of the lower substrate 11 as described in detail with reference to FIG. 5, the projections 21 may be formed in any shape. The same applies to the combination of the projections 22, the air space 13, and the upper substrate 12.

The cross-sectional area of the projection 21, parallel to the outer surface of the lower substrate 11, is preferably configured to decrease in a stepwise or continuous manner from the bottom 21A to the top 21B of the projection 21. This shape serves to avoid the sudden change in the effective refractive index in the region between the air space 13 and the outer surface of the lower substrate 11, thereby further reducing the light reflection and diffraction at the surface of the lower transparent electrode 15. The same applies to the combination of the projection 22, the upper substrate 12, the bottom 22A and the top 22B of the projection 22, and the upper transparent electrode 16.

Exemplary shapes of the projection 21 other than the shape described in the embodiment will be described with reference to FIGS. 7(a) to (h). The same can apply to the shapes of the projection 22.

The projection 21 may be formed as any of various truncated pyramids including a truncated triangular pyramid shown in FIG. 7(a). Alternatively, the projection 21 may be formed as a truncated cone shown in FIG. 7(b). The projection 21 may have a plurality of top surfaces as shown in FIG. 7(c), or the projection 21 may be formed as either of a pyramid and a cone including a quadrangular pyramid and a triangular pyramid shown in FIGS. 7(d) to (f).

FIGS. 7(a) to (f) illustrate the projection 21 in which the cross-sectional area is configured to decrease continuously from the bottom to the top of the projection. As shown in FIGS. 7(g) and (h), however, the projection may have a plurality of quadrangular prisms or cylinders stacked on top of one another, each having a base area different from others, so as to reduce the cross-sectional area of the projection 21 in a stepwise manner from the bottom 21A to the top 21B of the projection 21.

The structure of an analog resistive contact-type touch panel according to a second embodiment of the present invention will now be described. The basic structure of the touch panel according to the second embodiment is similar to that of the touch panel according to the first embodiment. The touch panel according to the first embodiment has a structure in which the projections are formed in a predetermined pattern on the inner surface of the substrate, and the transparent electrode is formed over the inner surface of the substrate having projections thereon. Meanwhile, the touch panel according to the second embodiment differs only in a structure in which a transparent electrode provided with projections formed in a predetermined pattern with substantially periodical pitches shorter than any wavelength of visible light is formed on the inner surface of a flat substrate. The overall structure of the touch panel according to the second embodiment will not be shown in the following drawings because it is the same as the structure according to the first embodiment shown in FIGS. 1 and 2.

The structure of the touch panel according to the second embodiment will be described with reference to FIGS. 8 and 9, which correspond to FIGS. 3 and 4 of the first embodiment, respectively. FIG. 8 is a fragmentary exploded perspective view illustrating only a substrate and a transparent electrode of the touch panel according to the second embodiment in an enlarged scale. FIG. 9 is a fragmentary sectional view in an enlarged scale, taken along the line B–B' indicated in FIG. 8, of the touch panel according to the second embodiment. In FIGS. 8 and 9, like components are identified by the same reference numerals as in the first embodiment, and like descriptions will not be repeated. Each layer and each member are drawn in a different scale in each drawing so as to be large enough to be visible.

As shown in FIGS. 8 and 9, a touch panel 50 has a flat lower substrate 51 and a flat upper substrate 52 opposing each other with a predetermined spacing therebetween. Inner surfaces of the lower substrate 51 and the upper substrate 52 respectively have a lower transparent electrode 55 and an upper transparent electrode 56, formed on substantially the entire surfaces corresponding to at least an input area by a finger, a pen, or the like. The lower transparent electrode 55 and the upper transparent electrode 56 are respectively provided with pluralities of projections 61 and 62 in a respectively predetermined pattern.

Because the lower substrate 51 and the upper substrate 52, and the lower transparent electrode 55 and the upper transparent electrode 56 are made of the same materials as the corresponding ones in the first embodiment, descriptions about the materials will not be repeated. Similarly to the first embodiment, the upper substrate 52 and the lower substrate 51 of the touch panel 50 are assumed to lie at the operator side and the display device side, respectively.

The projections 61 and 62 respectively formed on the inner surfaces of the lower transparent electrode 55 and the upper transparent electrode 56 are configured to have the similar shape and pattern as the projections formed on the inner surfaces of the substrates in the first embodiment.

That is, as shown in FIG. 8, each of the projections 61 and 62 can be formed as a truncated quadrangular pyramid, similarly to the projections in the first embodiment. Reference numerals 61A and 62A respectively represent the bottoms of the projections 61 and 62, and reference numerals 61B and 62B respectively represent the tops of the projections 61 and 62. The cross-sectional area of each of the projections 61, parallel to the outer surface of the lower substrate 51, is formed to decrease continuously from the bottom 61A to the top 61B of the projection 61. The same applies to the combination of each of the projections 62 of the upper substrate 52, and the bottom 62A and the top 62B of the projection 62.

The bottom 61A of the projection 61 lies on the display device side (the lower side shown in the drawing) and the top 61B of the projection 61 lies on the operator side (the upper side shown in the drawing). On the other hand, the bottom 62A of the projection 62 lies on the operator side (the upper side shown in the drawing) and the top 62B of the projection 62 lies on the display device side (the lower side shown in the drawing).

As shown in FIG. 8, the projections 61 and 62 are arranged on the inner surfaces of the lower transparent electrode 55 and the upper transparent electrode 56, respectively, in a substantially periodical manner in three directions shown in the drawing; the vertical and horizontal directions which are orthogonal to each other, and the diagonal direction, thus being in a substantially matrix configuration as a whole, similarly to the projections in the first embodiment.

Similarly to the projections in the first embodiment, pitches P4, P5 and P6 of the projections 61 and 62 in the horizontal, vertical, and diagonal directions shown in the drawing are arranged to be shorter than any wavelength of visible light. The pitches P4, P5 and P6 of the projections 61 and 62 are preferably equal to or shorter than about one fifth of the shortest wavelength of visible light. The shorter the pitches P4, P5 and P6 of the projections 61 and 62, the better, however, the pitches P4, P5 and P6 of the projections 61 and 62 are preferably arranged to range from 10 to 100 nm since pitches shorter than 10 nm cause the fabrication step of the projections 61 and 62 to become more complicated. Though illustrated in an exaggerated manner, the pitches P4, P5 and P6 of the projections 61 and 62 are extremely small, i.e., on the order of nanometers, while the distance between the lower transparent electrode 55 and the upper transparent electrode 56 is on the order of micrometers.

In the second embodiment, as described above, the lower transparent electrode 55 having the large number of fine projections 61 arranged with the substantially periodical pitches P4, P5, and P6 shorter than any wavelength of visible light is formed on the inner surface of the flat lower substrate 51. The same applies to the combination of the upper transparent electrode 56, the upper substrate 52, and the large number of projections 62.

Thus, projections and depressions having a predetermined shape are also formed on the inner surface of the lower transparent electrode 55 with the substantially periodical pitches P4, P5, and P6 shorter than any wavelength of visible light. The same applies to the combination of the upper transparent electrode 56 and the large number of fine projections 62. With this structure, the light reflection and diffraction at the boundary between the air space 13 and the lower transparent electrode 55 and at the boundary between the air space 13 and the upper transparent electrode 56 can be reduced, thereby providing the analog resistive contact-type touch panel 50 having high light transmittance.

According to the second embodiment, the lower transparent electrode 55 and the upper transparent electrode 56 are provided with the projections 61 and 62, respectively. Accordingly, both kinds of light reflection decrease: one for light incident from the operator side and reflected at the surface of the lower transparent electrode 55, and the other for light emitted from the display device side and reflected at the surface of the upper transparent electrode 56.

When the projections 61 and 62 are formed only in one direction in a substantially periodical manner, polarized light travelling orthogonal to the direction does not see the periodic structure of the projections 61 and 62. That is, the reflection and diffraction of the polarized light are not reduced at the boundary between the air space 13 and the lower transparent electrode 55 and at the boundary between the air space 13 and the upper transparent electrode 56. In the second embodiment, however, the reflection and diffraction of all visible light at the boundary between the air space 13 and the lower transparent electrode 55 and at the boundary between the air space 13 and the upper transparent electrode 56 can be reduced by arranging the projections 61 and 62 in a substantially periodical manner in three directions including two mutually orthogonal directions.

Further, in the second embodiment, each of the projections 61 can be formed such that the cross-sectional area of the projection 61, parallel to the surface of the lower substrate 51, decreases continuously from the bottom 61A to the top 61B of the projection 61. Defining the shape of the projection 61 as described above allows the effective refractive index to change gradually in the region between the air space 13 and the outer surface of the lower substrate 51, thereby further reducing the light reflection and diffraction at the boundary between the air space 13 and the lower transparent electrode 55. The same applies to the combination of each of the projections 62, the bottom 62A and the top 62B of the projection 62, the upper substrate 52, and the upper transparent electrode 56.

It should be understood that the shape and the pattern of the projections 61 and 62 are not limited to the ones described in the second embodiment, but the projections 61 Land 62 may be formed in any of various shapes and patterns in a similar fashion to the projections in the first embodiment without departing from the spirit and scope of the present invention.

The structure of a digital resistive contact-type touch panel according to a third embodiment of the present invention will now be described. The overall structure and the principle of position detection of the digital resistive contact-type touch panel according to the third embodiment will be described briefly with reference to FIG. 10. FIG. 10 is a plan view of the overall structure of the touch panel according to the third embodiment wherein the touch panel is viewed from above an upper substrate of the touch panel such that a lower substrate and the upper substrate of the touch panel are staggered while being parallel to each other. FIG. 10 corresponds to FIG. 2 in the first embodiment.

Since the basic structure of the digital resistive contact-type touch panel 70 according to the third embodiment is the same as that of the analog resistive contact-type touch panels according to the first and second embodiments, descriptions about the basic structure of the former touch panel will not be repeated, and only the differences will be described briefly.

The analog resistive contact-type touch panel has the lower transparent electrode and the upper transparent electrode formed on substantially the entire inner surfaces of the lower substrate and the upper substrate, respectively. Meanwhile, a touch panel 70 according to the third embodiment has lower transparent electrodes 75 and upper transparent electrodes 76 formed on the inner surfaces of a lower substrate 71 and an upper substrate 72 in a stripe-like configuration, respectively. In addition, the lower transparent electrodes 75 and the upper transparent electrodes 76 are arranged so as to cross each other.

Each of the lower transparent electrodes 75 is connected to a corresponding line of wiring 81 so that the lower transparent electrode 75 has its own electric potential. The same applies to the combination of each of the upper transparent electrodes 76, a corresponding line of wiring 82, and the upper transparent electrodes 76.

The touch panel 70 according to the third embodiment is configured by using a resistive contact type in the same fashion as the touch panels according to the first and second embodiments. That is, the touch panel 70 has a structure in which the flexible upper substrate 72 is deformed at a position of the upper substrate 72 which is pressed by a finger, a pen, or the like from the outer surface of the upper substrate 72, thereby causing one of the upper transparent electrodes 76 to come into contact with the corresponding one of the lower transparent electrodes 75 at the pressed position. This structure allows the touch panel 70 to perform position detection.

The principal of the position detection in the touch panel 70 according to the third embodiment will now be described briefly. For position detection in the horizontal direction shown in the drawing, a predetermined voltage is applied to each line of wiring 82 of the upper substrate 72 so as to provide each of the upper transparent electrodes 76 with a different potential while providing all the lower transparent electrodes 75 with an equipotential. Thus, a horizontal position is detected based on the principal in which the detected voltage varies depending on the position where one of the lower transparent electrodes 75 is put in contact with another one of the upper transparent electrodes 76 by a finger, a pen, or the like.

In the meantime, position detection in the vertical direction shown in the drawing is accomplished in a similar fashion to that in the horizontal direction shown in the drawing. That is, a predetermined voltage is applied on each line of wiring 81 of the lower substrate 71 so as to provide each of the lower transparent electrodes 75 with a different potential while providing all the upper transparent electrodes 76 with an equipotential. Thus, a vertical position is detected based on the principle in which the detected voltage varies depending on the position where one of the lower transparent electrodes 75 is put in contact with another one of the upper transparent electrodes 76 by a finger, a pen, or the like.

With the above-described principle of position detection in the vertical and horizontal directions, a position (a coordinate point) where one of the lower transparent electrodes 75 is put in contact with another one of the upper transparent electrodes 76 by a finger, a pen, or the like is detected. The digital touch panel, however, is different from the analog touch panel in position detection. In other words, it is capable of detecting only positions where the lower transparent electrodes 75 and the upper transparent electrodes 76 cross.

The present invention is applicable to the digital resistive contact-type touch panel 70 as described above. The touch panel 70 according to the third embodiment may have a structure in which fine projections are formed in a predetermined pattern on the inner surfaces of the lower substrate 71 and the upper substrate 72, and the lower transparent electrodes 75 and the upper transparent electrodes 76 are formed in a stripe-like configuration over the inner surfaces of the lower substrate 71 and the upper substrate 72 having the fine projections thereon in a similar fashion to the touch panel in the first embodiment. Alternatively, the touch panel 70 may have a structure in which the stripe-like lower transparent electrodes 75 and the stripe-like upper transparent electrodes 76 both having fine projections with a predetermined pattern are formed on the surfaces of the flat lower substrate 71 and the flat upper substrate 72 in a similar fashion to the touch panel in the second embodiment.

With this structure, the touch panel 70 has features similar to those of the first and the second embodiments. In other words, the light reflection at the boundary between the air space and the lower transparent electrodes 75 and at the boundary between the air space and the upper transparent electrodes 76 is reduced. The digital resistive contact-type touch panel 70 having high light transmittance is thus provided.

While each line width of the lower transparent electrodes 75 and the upper transparent electrodes 76 is on the order of micrometers, each of the projections formed on the inner surfaces of the lower substrate 71 and the upper substrate 72 or on the inner surfaces of the lower transparent electrodes 75 and the upper transparent electrodes 76 is on the order of nanometers, that is, extremely small compared to the line width of the lower transparent electrodes 75 and the upper transparent electrodes 76.

It should be understood that the present invention is not limited to the resistive contact-type touch panels as described in the first to third embodiments, but is applicable to any touch panel as long as the touch panel has an air space arranged to be in contact with a transparent electrode. A touch panel having an air space arranged to be in contact with a transparent electrode may include, for example, an electrostatic capacitive coupling-type touch panel besides the resistive contact-type one.

The structure and the principal of position detection of the electrostatic capacitive coupling-type touch panel will now be described briefly. The structure of the electrostatic capacitive coupling-type touch panel is similar to that of the digital resistive contact-type touch panel. In the structure, stripe-like lower transparent electrodes and stripe-like upper transparent electrodes are respectively formed on the inner surfaces of a lower substrate and an upper substrate which oppose each other and between which an air space is interposed. The lower transparent electrodes and the upper transparent electrodes are arranged to cross each other.

Since a certain amount of capacitance is formed between the lower transparent electrodes and the upper transparent electrodes of the electrostatic capacitive coupling-type touch panel, when an operator touches the outer surface of the upper substrate with a finger, the operator's body functioning as a ground attracts electric charge, thus changing the amount of capacitance. The electrostatic capacitive coupling-type touch panel is characterized by performing position detection by measuring the amount of capacitance. While the resistive contact-type touch panel is required to input by deforming the upper substrate with a finger, a pen, or the like, the electrostatic capacitive coupling-type touch panel is capable of performing position detection without deforming the upper substrate, thereby eliminating a special pen and possibly leading to detecting a trace made by a finger or the like which moves continuously on the upper substrate.

The present invention is applicable to the electrostatic capacitive coupling-type touch panel as described above. As described in the first to third embodiments, the electrostatic capacitive coupling-type touch panel may have a structure in which fine projections are formed in a predetermined pattern on the inner surfaces of the lower substrate and the upper substrate, and the lower transparent electrodes and the upper transparent electrodes are respectively formed in a stripe-like configuration over the inner surfaces of the lower substrate and the upper substrate having the fine projections thereon. Alternatively, the touch panel may have a structure in which the stripe-like lower transparent electrodes and the stripe-like upper transparent electrodes having fine projections with a predetermined pattern are respectively formed on the surfaces of the flat lower substrate and the flat upper substrate.

With this structure, the touch panel has features similar to those of the first to third embodiments. In other words, the light reflection at the boundary between the air space and the lower transparent electrodes and at the boundary between the air space and the upper transparent electrodes is reduced. The electrostatic capacitive coupling-type touch panel having high light transmittance is thus provided.

The present invention is further applicable to an analog electrostatic capacitive coupling-type touch panel in which a transparent conductive resistive film is coated on the entire surface of a substrate at the operator side and external electrodes for applying and detecting a voltage are provided at the four corners of the substrate. With this structure, a uniform electric field is formed by applying a voltage among the electrodes at the four corners. When a finger touches the conductive resistive film, the electric field varies by electrostatic capacitive coupling occurring at the touched position of the film. Because the current value at each corner is in proportion to the distance from the corner to the touched position, position detection is performed by measuring current values at four corners. Thus, the reflectivity at the boundary between the transparent electrode and the air space can be reduced, thereby providing a touch panel having high light transmittance.

The following describes a comparative example between the present invention and a touch panel of a conventional arrangement.

First, a substrate made of polycarbonate (PC), provided with a transparent electrode, was prepared such that a large number of fine projections were formed on one surface of the substrate and the transparent electrode made of indium tin oxide with a thickness of about 70 nm was formed over substantially the entire surface of the substrate having the large number of projections thereon.

Each of the projections was formed as a truncated quadrangular pyramid, having a height of 100 mn, a square bottom with a side of 100 nm, and a square top with a side of 40 nm. The projections were periodically arranged with the same pitch of 120 nm in two mutually orthogonal directions so as to be in a matrix-like configuration as a whole.

Next, a substrate provided with a transparent electrode was prepared in a similar fashion to the first, except that the transparent electrode was flat and formed on one of the surfaces of the flat substrate.

The above substrates provided with transparent electrodes prepared according to the present invention and the conventional arrangement, were then compared. The reflectivities at the surfaces of the transparent electrodes of the substrates with transparent electrodes were measured by irradiating the substrate with light having a wavelength ranging from 400 to 700 nm from the transparent electrode side. The measurements showed that the reflectivities of the substrates of the present invention and the conventional arrangement were 6 percent and 12 percent, respectively. The measurements also revealed that projections and depressions formed in a predetermined shape on the surface of the transparent electrode with a pitch shorter than any wavelength of visible light reduce the light reflection at the boundary between the air space and the transparent electrode.

As described above, the touch panel according to the present invention is provided with projections and depressions with a predetermined shape and a predetermined pattern formed with a pitch shorter than any wavelength of visible light, on the inner surface of the transparent electrode of at least one of the substrates in the following two ways. One arrangement is such that a plurality of projections are formed on the inner surface of at least one of the substrates with a substantially periodical pitch shorter than any wavelength of visible light, and the transparent electrode is formed over the inner surface of the substrate having the plurality of projections. The other arrangement is such that the transparent electrode provided with a plurality of projections having a predetermined shape and formed with a substantially periodical pitch shorter than any wavelength of visible light are formed on the surface of the flat substrates.

In addition, the touch panel according to the present invention is preferably arranged to have projections, each having a cross-sectional area parallel to the outer surface of the substrate which decreases in a stepwise or continuous manner from the bottom to the top of the projection.

The structures as described above reduce the light reflection and diffraction at the boundary between the air space and the transparent electrode, thereby providing a resistive contact-type touch panel or a electrostatic capacitive coupling-type touch panel both having high light transmittance.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A touch panel, comprising:
a pair of substrates opposing each other;
transparent electrodes formed on both of the pair of substrates, pairs of the transparent electrodes that face each other from different ones of the substrates being capable of selective contact with and separation from each other, the pair of transparent electrodes having an upper surface that locally protrudes, at a plurality of separate locations, substantially toward the other of the pair of transparent electrodes so that the pair of transparent electrodes are provided with a plurality of projections that are formed at a substantially periodical pitch that is shorter than any wavelength of visible light,
wherein the projections that are provided on one of the pair of transparent electrodes face the other projections that are provided on the other of the pair of transparent electrodes,
surfaces of the projections that are provided on both of the pair of transparent electrodes are formed from the transparent electrodes.

2. The touch panel according to claim 1, an air space being formed between the pair of transparent electrodes.

3. The touch panel according to claim 1, each of the projections becoming smaller from a bottom to a top thereof.

4. The touch panel according to claim 3, each of the projections becoming continuously smaller from the bottom to the top thereof.

5. The touch panel according to claim 3, each of the projections becoming smaller in a stepwise manner from the bottom to the top thereof.

6. The touch panel according to claim 3, each of the projections being formed as one of a truncated pyramid, a truncated cone, a pyramid and a cone.

7. The touch panel according to claim 1, the plurality of projections being arranged with a substantially periodical pitch in at least two directions.

8. The touch panel according to claim 1, the plurality of projections having a pitch shorter than 100 nm.

9. The touch panel according to claim 1, the plurality of projections being formed on surfaces of the pair of transparent electrodes.

10. The touch panel according to claim 9, the plurality of projections formed on the surface of one of the pair of transparent electrodes having the same pattern as that of the other transparent electrode.

11. The touch panel according to claim 9, the plurality of projections formed on the surface of one of the pair of transparent electrodes having a pattern different from that of the other transparent electrode.

12. The touch panel according to claim 1, each of the projections being formed by providing a projection of the transparent electrode on a flat substrate.

13. The touch panel according to claim 1, further comprising a plurality of spacers positioned between the pair of transparent electrodes that maintain the spacing between the pair of transparent electrodes.

14. The touch panel according to claim 1, the touch panel being at least one of an analog resistive contact type, a digital resistive contact type, and an electrostatic capacitive coupling type.

15. A touch panel, comprising:
a pair of substrates having inner surfaces that oppose each other and that have a predetermined spacing therebetween;
a pair of transparent electrodes formed in a predetermined pattern on the inner surfaces of the pair of substrates;
a spacer positioned between the pair of transparent electrodes; and
the transparent electrodes having an upper surface that locally protrudes, at a plurality of separate locations, substantially toward the other of the pair of transparent electrodes so that the pair of transparent electrodes are provided with a plurality of projections that are formed from a substantially periodical pitch that is shorter than any wavelength of visible light, contact between the pair of transparent electrodes initiating position detection,
wherein the projections that are provided on one of the pair of transparent electrodes face the other projections that are provided the other of the pair of transparent electrodes, surfaces of the projections that are provided on both of the pair of transparent electrodes are formed from the transparent electrodes.

16. A touch panel, comprising:
a first substrate;
a second substrate opposing the first substrate and having flexibility;
a first transparent electrode formed over the first substrate from a conductive material, the first transparent electrode having a plurality of first projections at a substantially periodical pitch that is shorter than any wavelength of visible light, the plurality of first projections each having a first top that faces the second substrate, each first top being formed from the conductive material; and
a second transparent electrode formed over the second substrate from the conductive material, the second transparent electrode having a plurality of second projections at a substantially periodical pitch that is shorter than any wavelength of visible light, the plurality of second projections each having a second top that faces the first substrate, each second top being formed from the conductive material,
at least one of the first tops being selectively brought into physical contact with at least one of the second tops when the second substrate flexes, the physical contact resulting in an electrical connection.

* * * * *